US012519243B2

(12) United States Patent
Merk et al.

(10) Patent No.: US 12,519,243 B2
(45) Date of Patent: Jan. 6, 2026

(54) HORN ANTENNA ELEMENT

(71) Applicant: LISA DRÄXLMAIER GMBH, Vilsbiburg (DE)

(72) Inventors: Thomas Merk, Stuttgart (DE); Ievgen Bilogurov, Sindelfingen (DE)

(73) Assignee: LISA DRÄXLMAIER GMBH, Vilsbiburg (DE)

( * ) Notice: Subject to any disclaimer, the term of this patent is extended or adjusted under 35 U.S.C. 154(b) by 352 days.

(21) Appl. No.: 18/133,200

(22) Filed: Apr. 11, 2023

(65) Prior Publication Data

US 2023/0268657 A1 Aug. 24, 2023

Related U.S. Application Data

(63) Continuation of application No. PCT/EP2021/072831, filed on Aug. 17, 2021.

(30) Foreign Application Priority Data

Oct. 27, 2020 (GB) ...................................... 2017004

(51) Int. Cl.
*H01Q 13/02* (2006.01)
*H01Q 1/28* (2006.01)
*H01Q 15/24* (2006.01)

(52) U.S. Cl.
CPC ........... *H01Q 13/0275* (2013.01); *H01Q 1/28* (2013.01); *H01Q 15/242* (2013.01)

(58) Field of Classification Search
CPC ...... H01Q 1/28; H01Q 13/02; H01Q 13/0241; H01Q 13/16; H01Q 15/242
See application file for complete search history.

(56) References Cited

U.S. PATENT DOCUMENTS

| | | | |
|---|---|---|---|
| 9,112,279 B2 | | 8/2015 | Montgomery et al. |
| 9,559,428 B1 | * | 1/2017 | Jensen .................. H01Q 13/18 |
| 10,096,904 B2 | * | 10/2018 | Bongard ................. H01Q 5/55 |
| 10,840,605 B2 | * | 11/2020 | Hollenbeck ........ H01Q 21/0025 |
| 2010/0007432 A1 | | 1/2010 | Uher |
| 2015/0188238 A1 | | 7/2015 | Oppenlaender et al. |
| 2016/0072190 A1 | | 3/2016 | Merk |
| 2016/0301462 A1 | | 10/2016 | Marinov et al. |
| 2017/0069972 A1 | | 3/2017 | Miller et al. |

(Continued)

FOREIGN PATENT DOCUMENTS

CN 203326116 U 12/2013

OTHER PUBLICATIONS

International Search Report issued in corresponding International Application PCT/EP2021/072831, mailed Nov. 17, 2021.

(Continued)

*Primary Examiner* — Hasan Islam
(74) *Attorney, Agent, or Firm* — Burris Law, PLLC

(57) ABSTRACT

A horn antenna element includes a septum polarizer configured to transform a linear polarized input signal into a circular polarized output signal at a common port, and a horn radiator. The horn radiator includes an input geometry formed as a quad-ridge waveguide to receive the circular polarized output signal at the common port and an aperture grid to radiate a grid-based circular polarized output signal. The septum polarizer is embedded in the quad-ridge waveguide at the common port.

13 Claims, 12 Drawing Sheets

(56) References Cited

U.S. PATENT DOCUMENTS

| | | | |
|---|---|---|---|
| 2017/0222310 | A1 | 8/2017 | Merk |
| 2022/0029257 | A1 | 1/2022 | Menargues Gomez et al. |

OTHER PUBLICATIONS

Search Report issued in corresponding GB Application 2017004.9. issued Apr. 20, 2021, 4 pages.

Ghoncheh Jazani,Design of dual-polarised (RHCP/LHCP) quad-ridged horn antenna with wideband septum polariser waveguide feed, IET Microwaves, Antennas & Propagation, Apr. 17, 2018, vol. 12, Iss. 9, pp. 1541-1545, The Institution of Engineering and Technology, 2018.

* cited by examiner

HORN ANTENNA ELEMENT

CROSS-REFERENCE TO RELATED APPLICATIONS

This application is a continuation of International Application No. PCT/EP2021/072831, filed on Aug. 17, 2021, which claims priority to, and the benefit of Great Britain Application No. 2017004.9 filed on Oct. 27, 2020. The disclosures of the above applications are incorporated herein by reference.

FIELD

The present disclosure relates to a horn antenna element and an airborne satellite communication system comprising such a horn antenna element.

BACKGROUND

The statements in this section merely provide background information related to the present disclosure and may not constitute prior art.

In satellite communication, in particular on-the-move satellite communication systems, multimedia data is transmitted from a satellite network to moving vehicles, such as airplanes, helicopters, vessels or cars. Antennas must be installed on the moving vehicles. For tracking the desired satellite(s), these antennas should be directive. In today's applications, K frequency band (17.7 GHz-20.2 GHz) or Ka frequency band (27.5 GHz-30.0 GHz) may be used for data transmission.

For an efficient communication with high data rates, dual band operation, i.e., in both K and Ka-frequency bands and dual circular polarization is required.

Current available solutions are using quad-ridged micro-horns, that are smaller than 1 wavelength at the highest frequency, in an array combined with hybrid couplers or a meander polarizer to achieve circular polarization. The disadvantage of the micro-horn technology is that it incorporates stripline-based feeding circuits which exhibit higher ohmic losses than waveguides, thereby reducing the array efficiency and key performance figures like G/T (gain over noise temperature). Those micro-horn arrays are inherently linear polarized and need an additional external component to convert between linear and circular polarizations, such as a hybrid coupler or a meander polarizer.

Other available solutions are using reflector or lens antennas, fed by a single horn. Those systems typically exhibit lower efficiencies than horn arrays due to amplitude tapering, spillover and feed-blockage effects.

Available septum polarizers realized in standard rectangular/quadratic waveguide geometries only work in much more narrow frequency ranges.

According to U.S. Patent Publication No. 2017/222310 A1, a cover of an antenna for electromagnetic radiation of a specific wavelength comprises a layer with uniformly arranged cellular embossments. When viewed from an upper side or lower side of the layer, the layer within an embossment is spaced apart from the layer outside of the embossment by a distance that corresponds to approximately ¼ of the wavelength of the antenna signals. The cover and hence also the underside of the layer are later mounted in the direction of radiation of the antenna and in spaced relationship to the antenna, thereby forming a radome for the antenna.

U.S. Patent Publication No. 2016/072190 A1 is related to a radiating element comprising an antenna, which is separated from an antenna edge by a corrugation and is used for antenna systems that support bidirectional satellite communication operated in the Ka, Ku or X frequency bands for mobile and aeronautical applications.

SUMMARY

This section provides a general summary of the disclosure and is not a comprehensive disclosure of its full scope or all of its features.

The present application provides techniques for reliable and efficient satellite communications, in particular for on-the-move satellite communication systems, in which multimedia data is transmitted from a satellite network to moving vehicles, such as airplanes, helicopters, vessels or cars.

In one form, the present application provides an efficient and reliable antenna element for such satellite communications. The antenna element should provide high data rate and reliable communication and dual band operation, in particular dual band operation in both K and Ka-frequency bands. The antenna element should also support dual circular polarization.

A basic idea of the present application is to apply a new design of a horn radiator element which simultaneously supports dual-band operation (e.g., K/Ka Band Rx 17.7 GHz-20.2 GHz and Tx 27.5 GHz-30.0 GHz) and dual circular polarization (left-handed circular polarization—LHCP—and right-handed circular polarization—RHCP). The horn radiator element will be the unit cell of an arbitrary sized high efficiency horn array aperture antenna with approximately circular outline. In order to achieve a high antenna efficiency and low ohmic losses, a solution using waveguide technology is provided. The antenna can be used as part of an on-the-move satellite communication system based on a multi-axis positioner, e.g. azimuth, elevation, skew, permanently aligning the antenna to a given target satellite.

The present application combines dual band operation and dual circular polarization in a highly efficient way by combining multiple radio frequency (RF) design techniques into a new very compact horn radiator/OMT design as described hereinafter.

The horn element itself is designed as an oversized radiator, i.e. larger than one wavelength, typically two wavelengths or larger at the highest frequency of operation, using both a quad-ridged waveguide input geometry to enable very wideband (dual-band) operation and a specially designed aperture grid to divide the single radiator into a virtual 2×2 elements array. This grid significantly reduces grating lobes in the antenna pattern that appear inherently due to the unit cell size exceeding one wavelength at the highest frequency of operation.

For the orthomode-transducer (OMT) a septum polarizer embedded in a quad-ridge waveguide at the common port is used. With this approach, the OMT serves both tasks of combining two orthogonal polarizations into a common waveguide and at the same time converting the linear polarized TE1,0 modes into the corresponding circular polarized LHCP/RHCP modes.

In order to describe the present disclosure in detail, the following terms, abbreviations and notations will be used:

OMT orthomode-transducer

LHCP Left-handed circular polarization

RHCP Right-handed circular polarization

RF radio frequency

K-Band Frequency band between 17.7 GHz and 20.2 GHz

Ka-Band Frequency band between 27.5 GHz and 30.0 GHz

TE1,0 mode a waveguide mode where the electric field is perpendicular to the direction of propagation TE0,1 mode another waveguide mode where the electric field is perpendicular to the direction of propagation A septum polarizer as described in the present application is a linear-to-circular polarization converter. The septum polarizer is formed by two rectangular waveguides (ports 1 and 2, see references 501 and 502 in FIG. 5) sandwiched together with a common wide wall (septum) that is stepped down to zero height, producing a square waveguide common port. Assuming that RF power is applied to port 2 (ref 502 in FIG. 5), the signal travels through the waveguide and horizontal E-field component starts to split into 2 orthogonal field components along the stair of the polarizer. At the end of the square output one field component will be delayed by 90° over the other component, both components will have the same amplitude. For an ideal septum polarizer horizontal field, the horizontal component of the E-field is equal to the vertical component of the E-field and has a 90 degrees phase delay. Hence, right-hand circular polarization (RHCP) is formed (clockwise rotation). The same reasoning is applied to the left-hand circular polarization (LHCP) at port 1.

An orthomode transducer (OMT) as described in the present application is a waveguide component, commonly referred to as a polarization duplexer. Orthomode transducers serve either to combine or to separate two orthogonally polarized microwave signal paths. One of the paths forms the uplink, which is transmitted over the same waveguide as the received signal path, or downlink path. Such a device may be part of a satellite antenna feed or a terrestrial microwave radio feed. OMTs are often used with a feed horn to isolate orthogonal polarizations of a signal and to transfer transmit and receive signals to different ports.

A waveguide as described in the present application is a structure that guides waves, such as electromagnetic waves, with reduced loss of energy by restricting the transmission of energy to one direction.

A quad-ridged waveguide is a waveguide with conducting ridges protruding into the center of the waveguide from each of the side walls. The ridges of the top wall and the bottom wall are parallel to the side walls of the waveguide. The ridges of the left side wall and the right side wall are parallel to the top and bottom walls of the waveguide. Ridged Waveguides tend to have a lower impedance and wider bandwidth in their fundamental mode when compared to regular rectangular waveguides. They also have a lower cut-off frequency and have lower power handling capabilities. Ridged Waveguides can be used for impedance matching as they decrease the characteristic impedance of the waveguide. Ridged Waveguides offer higher bandwidth in comparison to the conventional waveguides.

A circular polarization of an electromagnetic wave according to the present application is a polarization state in which, at each point, the electromagnetic field of the wave has a constant magnitude but its direction rotates at a constant rate in a plane perpendicular to the direction of the wave. A circularly polarized wave can rotate in one of two possible senses: right-handed circular polarization (RHCP) in which the electric field vector rotates in a right-hand sense with respect to the direction of propagation, and left-handed circular polarization (LHCP) in which the vector rotates in a left-hand sense.

A linear polarization of an electromagnetic wave according to the present application is a confinement of the electric vector or magnetic vector to a given plane along the direction of propagation.

According to a first form of the present application a horn antenna element comprises: a septum polarizer configured to transform a linear polarized input signal into a circular polarized output signal at a common port; and a horn radiator comprising; an input geometry formed as a quad-ridge waveguide to receive the circular polarized output signal at the common port; and an aperture grid to radiate a grid-based circular polarized output signal, wherein the septum polarizer is embedded in the quad-ridge waveguide at the common port.

Such a horn antenna element provides the advantage of higher efficiency over existing micro-horn technology and a robust design due to the embedded polarizer as part of the OMT. Furthermore, there is a cost advantage over existing micro-horn technology due to missing stripline circuits and significantly larger waveguide structures that are easier and faster to machine.

The advantage over existing reflector-based solutions is the high efficiency and the configurability. Using an array allows to improve the aperture illumination by individually exciting each array element with specific amplitude/phase signal combinations.

In one form of implementation of the horn antenna element, the quad-ridge waveguide of the input geometry comprises four symmetrically formed ridges of equal size.

This provides the advantage that high frequency ranges can be used for transmission and reception, e.g., the K band and Ka band frequency ranges.

In one form of implementation of the horn antenna element, the aperture grid is formed as an array of quad-ridge waveguides, e.g., as a 2×2 array of quad-ridge waveguides.

This provides the advantage that quad-ridge waveguides have a lower impedance and wider bandwidth compared to regular rectangular waveguides. They can be used for impedance matching as they decrease the characteristic impedance of the waveguide. The quad-ridge waveguides offer higher bandwidth in comparison to non-ridged waveguides.

In one form of implementation of the horn antenna element, the quad-ridge waveguides of the aperture grid are symmetrically formed, each of the quad-ridge waveguides having a same cross section.

This provides the advantage that an array of circular polarized output signals having the same signal characteristics can be efficiently implemented when using a symmetrically formed aperture grid.

In one form of implementation of the horn antenna element, each of the quad-ridge waveguides of the aperture grid comprises four ridges.

This provides the advantage that a high quality circular polarized signal can be provided having a low axial ratio, thereby forming a nearly perfect polarization circle.

The size of the ridges can be equal or different. The ridges may be symmetrically or non-symmetrically formed.

In one form of implementation of the horn antenna element, ridges of the quad-ridge waveguide of the input geometry and ridges of the array of quad-ridge waveguides of the aperture grid are formed in a non-overlapping manner.

This provides the advantage that the circular polarized signal generated at the common port can be optimally mapped to the grid-based circular polarization signal to be radiated by the horn radiator.

In one form of implementation of the horn antenna element, the septum polarizer is configured to split an input TE1,0 mode of the linear polarized input signal into a mode combination of TE1,0 and TE0,1 with +/−90 degree phase difference in between, thereby creating an either left-handed circular polarization, LHCP, signal or right-handed circular polarization, RHCP, signal to be radiated by the horn radiator.

This provides the advantage that an efficient communication with high data rates, dual band operation in both K and Ka-frequency bands and dual circular polarization can be provided.

In one form of implementation of the horn antenna element, the horn antenna element comprises two single linear polarized ports configured to receive and/or transmit a respective linear polarized component of the linear polarized input signal.

This provides the advantage that the two single linear polarized ports allow to feed two different signals, e.g., in downlink and uplink direction for enabling dual band operation in both K and Ka-frequency bands.

In one form of implementation of the horn antenna element, the two single linear polarized ports are configured to simultaneously receive and transmit in a K-band frequency range and a Ka-band frequency range.

This provides the advantage that reliable and efficient satellite communications can be implemented. The antenna element provides high data rate, reliable communication and dual band operation in both K and Ka-frequency bands and supports dual circular polarization.

In one form of implementation of the horn antenna element, a reflection coefficient of the two single linear polarized ports is below a predetermined threshold, in one form below −15 dB, and free of resonances in both K-band and Ka-band.

This provides the advantage that high data rate communication can be implemented.

In one form of implementation of the horn antenna element, an axial ratio of the grid-based circular polarized output signal is below 1 dB in both K-band and Ka-band.

This provides the advantage that crosstalk between polarizations can be reduced.

In one form of implementation of the horn antenna element, the septum polarizer comprises continuous ridged waveguide geometries from the two single linear polarized ports to the quad-ridge waveguide of the horn radiator; and the septum polarizer is staircase-shaped to transform the linear polarized input signal into the circular polarized output signal.

This provides the advantage that the horn antenna element is easy to manufacture. In one form, a stair-case structure can be manufactured by common machines at low costs.

In one form of implementation of the horn antenna element, a cross section of the quad-ridge waveguide of the horn radiator corresponds to a cross section of the aperture grid of the horn radiator.

This provides the advantage that the circular polarized signal received at the common port can be efficiently mapped to the grid-based circular polarized signal to be radiated by the horn radiator's aperture grid.

In one form of implementation of the horn antenna element, a geometry of the horn radiator is oversized with respect to a wavelength at a specified maximum operation frequency, in one form larger than one or multiple wavelengths at the specified maximum operation frequency.

This provides the advantage that an array of circular polarized signals at maximum operation frequency can be provided for transmission and/or reception.

According to another form of the present application, an airborne satellite communication system comprises the horn antenna element according to the first aspect; and a multi-axis positioner configured to permanently align the horn antenna element to a given target satellite.

This provides the advantage that the horn antenna element can be efficiently applied for airborne satellite communication.

According to a third aspect, the present application relates to a method of converting a linear polarized signal to a circular polarized signal by a horn antenna element comprising a septum polarizer configured to transform a linear polarized input signal into a circular polarized output signal at a common port; and a horn radiator comprising: an input geometry formed as a quad-ridge waveguide to receive the circular polarized output signal at the common port; and an aperture grid to radiate a grid-based circular polarized output signal, wherein the septum polarizer is embedded in the quad-ridge waveguide at the common port. The method comprises: receiving a linear polarized signal by the septum polarizer; transforming, by the septum polarizer, the linear polarized input signal into a circular polarized output signal at the common port of the septum polarizer; receiving, by the horn radiator, the circular polarized output signal at the common port; and radiating, by the horn radiator, the circular polarized output signal through the grid as a grid-based circular polarized output signal.

Such a method provides as an advantage over existing reflector-based solutions high efficiency and configurability. Using an array allows to improve the aperture illumination by individually exciting each array element with specific amplitude/phase signal combinations.

According to a fourth aspect, the present application relates to a satellite communication method, comprising: aligning the horn antenna element according to the first aspect, by a multi-axis positioner of the airborne satellite communication system according to the second aspect, to a given target satellite. The aligning may be permanently performed. The airborne satellite communication system may comprise a processor configured to control the alignment of the horn antenna element.

According to a fifth aspect, the present application relates to a computer program product including computer executable code or computer executable instructions that, when executed, causes at least one computer to execute the method according to the fourth aspect. Such a computer program product may include a non-transient readable storage medium storing program code thereon for use by a processor.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
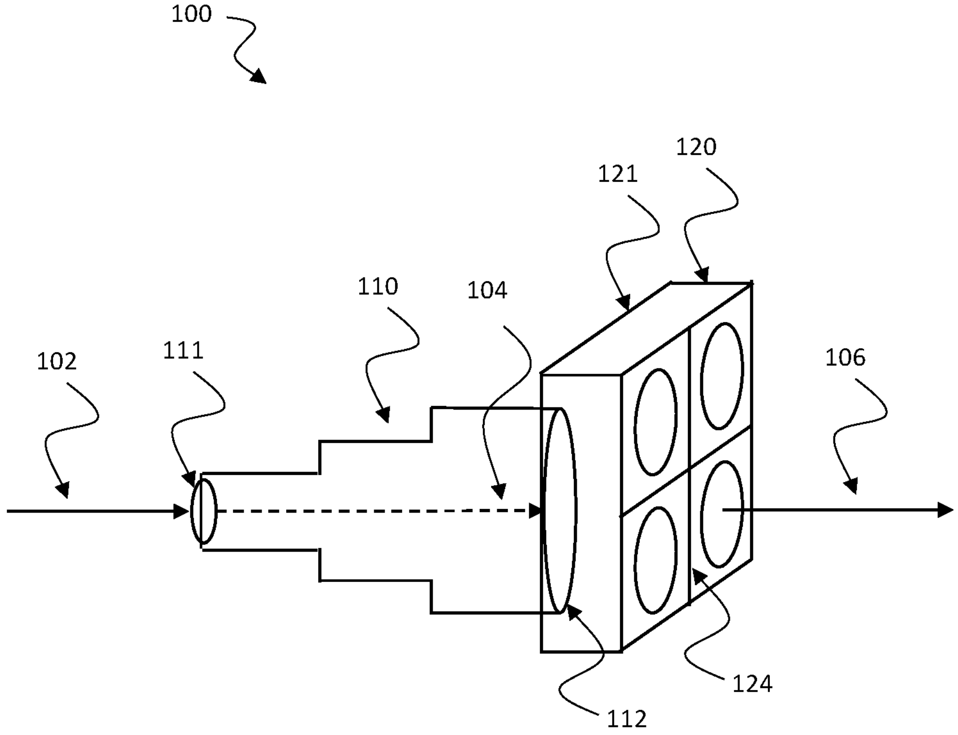
FIG. 1 shows a schematic diagram illustrating a horn antenna element, according to the present application.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a schematic diagram illustrating a horn antenna element 100 according to the present application.

The horn antenna element 100 comprises a septum polarizer 110 and a horn radiator 120. The septum polarizer 110 is configured to transform a linear polarized input signal 102 into a circular polarized output signal 104 at a common port 112. The horn radiator 120 comprises an input geometry formed as a quad-ridge waveguide 121 to receive the circular polarized output signal 104 at the common port 112. The horn radiator 120 further comprises an aperture grid 124 to radiate a grid-based circular polarized output signal 106. The grid-based circular polarized output signal 106 corresponds to the circular polarized output signal 104 after passing the aperture grid 124. The septum polarizer 110 is embedded in the quad-ridge waveguide 121 at the common port 112.

Both, septum polarizer 110 and horn radiator 120 may be embedded in a housing. The embedding of the septum polarizer 110 in the quad-ridge waveguide 121 may provide for a fixed arrangement of both parts in the horn antenna element 100 such that no rotation or movement of the septum polarizer 110 with respect to the horn radiator 120 is possible. The horn antenna element 100 may be formed of a single material. It is also possible to separately produce septum polarizer 110 and horn radiator 120 and connect both parts, e.g., by fusing, welding, bonding, and/or sticking, among others.

The linear polarized input signal 102 may be fed to an input port 111 of the horn antenna element by a feeding network (not shown in FIG. 1).

Figure 3:
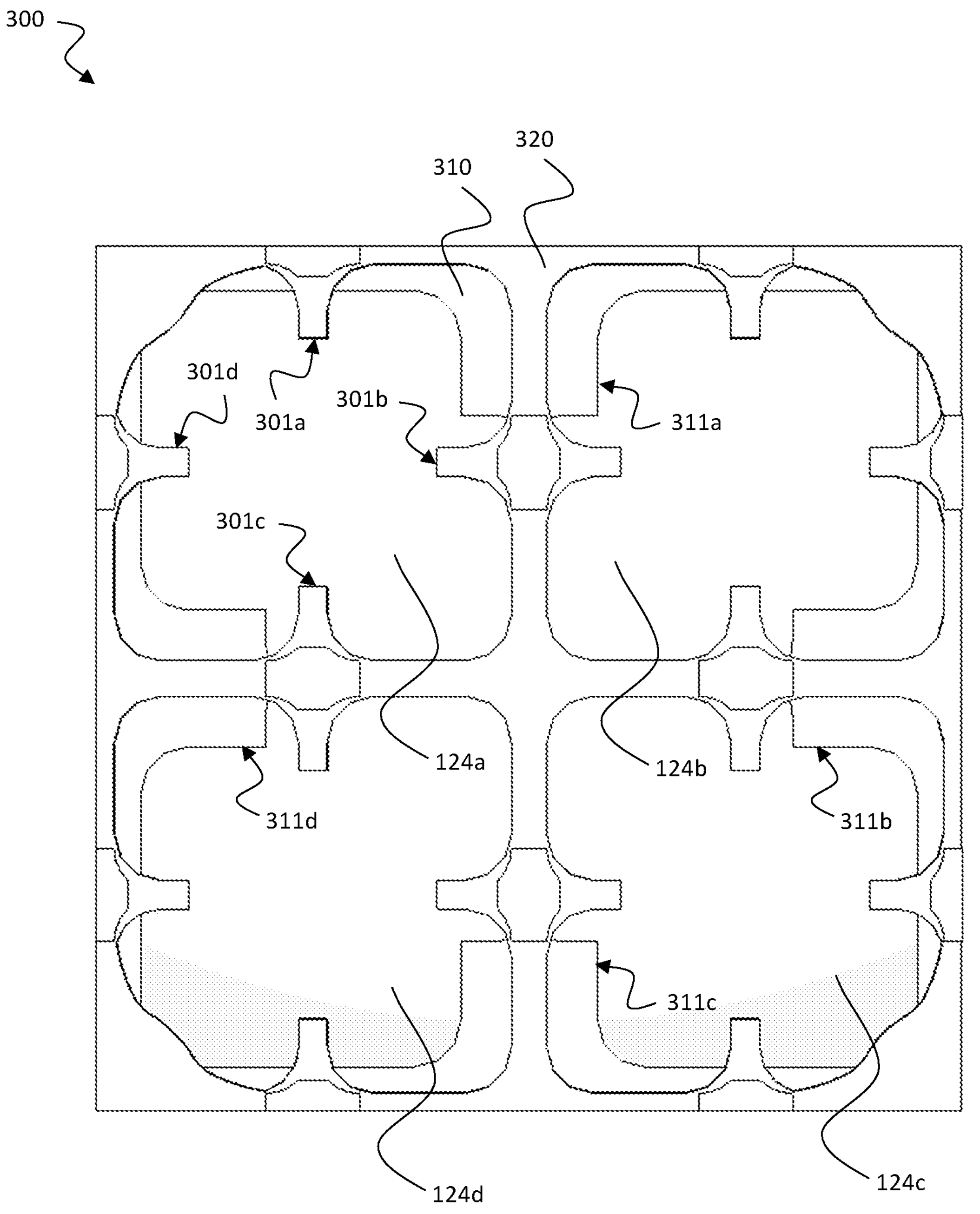
FIG. 3 shows a front view of an example horn antenna element, according to the present application.

The quadridge waveguide 121 of the input geometry may comprise four symmetrically formed ridges 311*a*, 311*b*, 311*c*, 311*d* of equal size, e.g., as shown in FIG. 3.

The aperture grid 124 may be formed as an array of quad-ridge waveguides 124*a*, 124*b*, 124*c*, 124*d*, e.g., as shown in FIG. 3, in one form as a 2×2 array of quad-ridge waveguides 124*a*, 124*b*, 124*c*, 124*d* as shown in FIG. 3.

The quad-ridge waveguides 124*a*, 124*b*, 124*c*, 124*d* of the aperture grid 124 may be symmetrically formed, such that each of the quad-ridge waveguides 124*a*, 124*b*, 124*c*, 124*d* has a same cross section, e.g., as shown in FIG. 3.

Each of the quad-ridge waveguides 124*a*, 124*b*, 124*c*, 124*d* of the aperture grid 124 may comprise four ridges 301*a*, 301*b*, 301*c*, 301*d*, e.g., as shown in FIG. 3.

The ridges 311*a*, 311*b*, 311*c*, 311*d* of the quad-ridge waveguide 121 of the input geometry and the ridges 301*a*, 301*b*, 301*c*, 301*d* of the array of quad-ridge waveguides 124*a*, 124*b*, 124*c*, 124*d* of the aperture grid 124 may be formed in a non-overlapping manner, e.g., as shown in FIG. 3.

Figure 7:
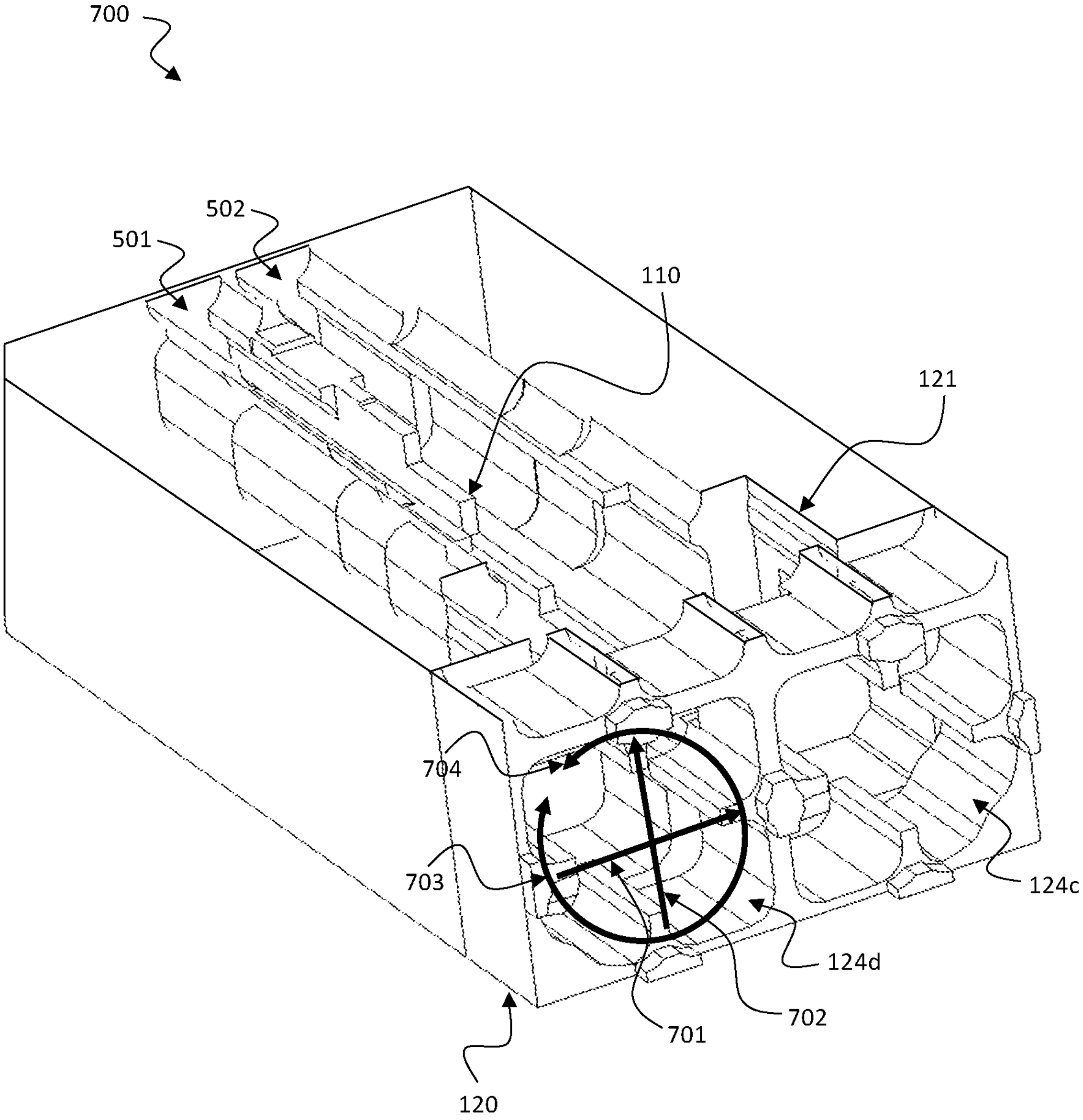
FIG. 7 shows a cut-plane view into an example horn antenna element, according to the present application.

The septum polarizer 110 may be configured to split an input TE1,0 mode of the linear polarized input signal 102 into a mode combination of TE1,0 (702) and TE0,1 (701) with +/−90 degree phase difference in between, thereby creating an either left-handed circular polarization, LHCP, signal 703 or right-handed circular polarization, RHCP, signal 704 to be radiated by the horn radiator 120, e.g. as shown in FIG. 7.

Figure 5:
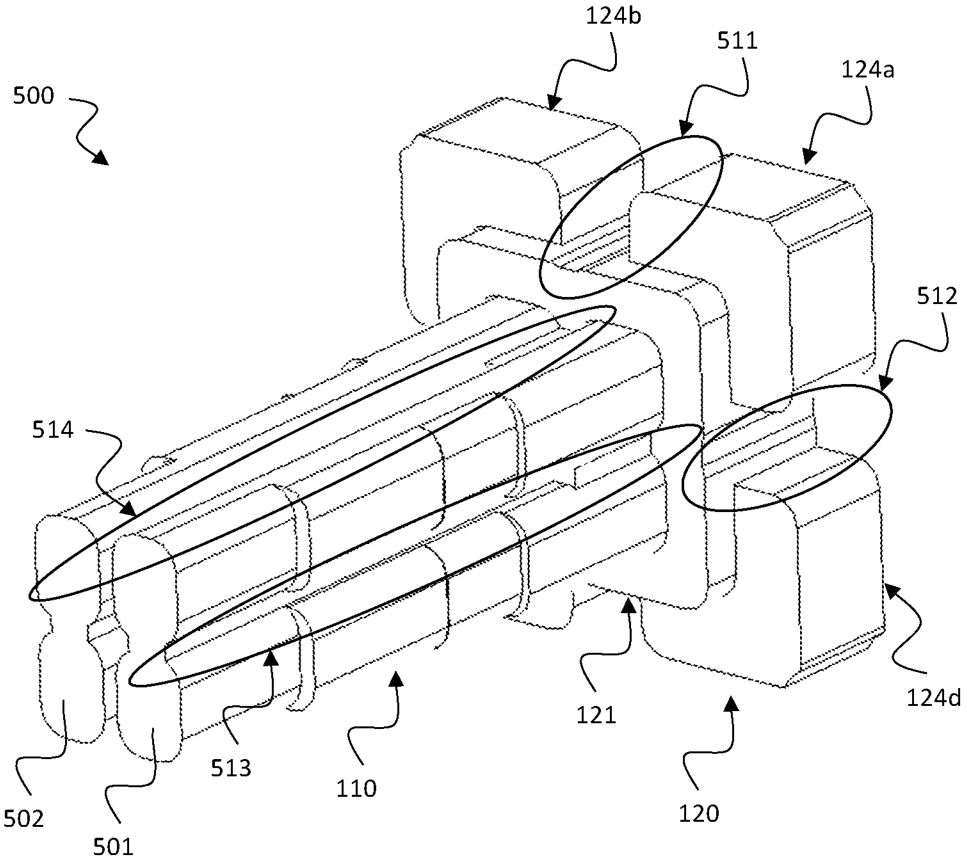
FIG. 5 shows a 3-dimensional representation of an example horn antenna element according to the present application.

The horn antenna element 100 may comprise two single linear polarized ports 501, 502 as shown in FIG. 5, which are configured to receive and/or transmit a respective linear polarized component of the linear polarized input signal 102. The two single linear polarized ports 501, 502 may be received and/or transmitted at the input port 111 of the horn antenna element 100.

It understands that the horn antenna element 100 is configured to transmit and receive signals simultaneously. E.g., a K-band signal may be received while simultaneously transmitting a Ka-band signal on each port.

Figure 11:
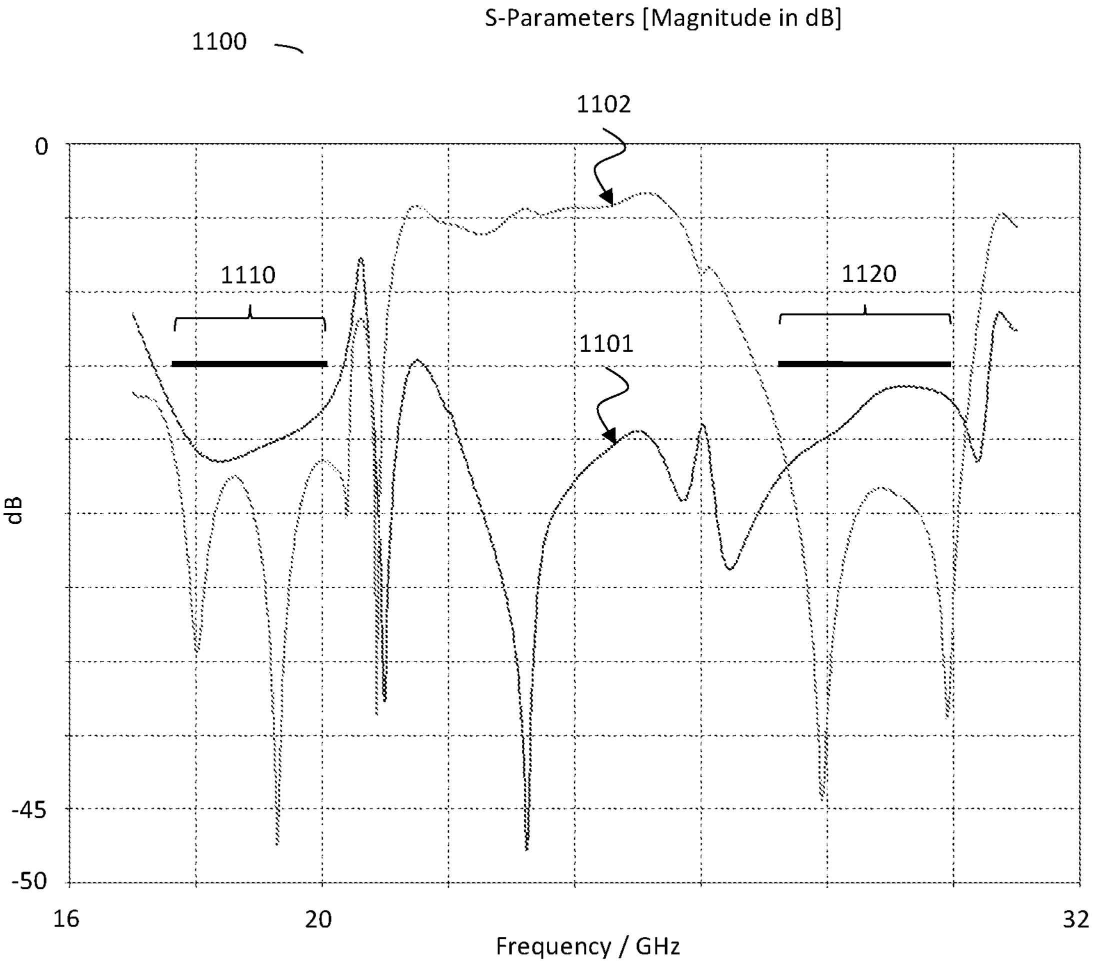
FIG. 11 shows a performance diagram illustrating S-parameters of an example horn antenna element, according to the present application.
Figure 12:
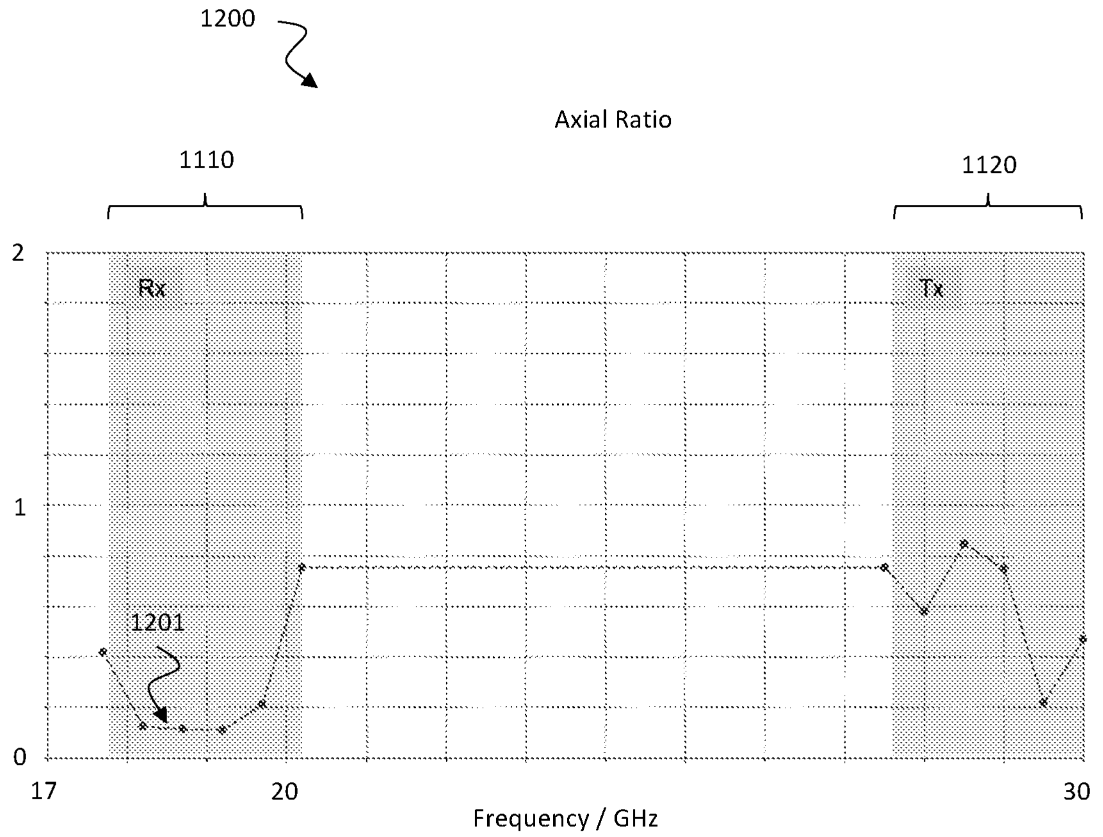
FIG. 12 shows a performance diagram illustrating axial ratio of an example horn antenna element, according to the present application.

The two single linear polarized ports 501, 502 may be configured to simultaneously receive and transmit in a K-band frequency range 1110 and a Ka-band frequency range 1120, e.g., as shown in FIGS. 11 and 12.

In one form of configuration of the horn antenna element, a reflection coefficient 1101 of the two single linear polarized ports 501, 502 may be below a predetermined threshold, in one form below −15 dB, and may be free of resonances in both K-band 1110 and Ka-band 1120, e.g., as shown in FIG. 11.

In one form of configuration of the horn antenna element, an axial ratio 1201 of the grid-based circular polarized output signal 106 may be below 1 dB in both K-band 1110 and Ka-band 1120, e.g., as shown in FIG. 12.

Figure 6:
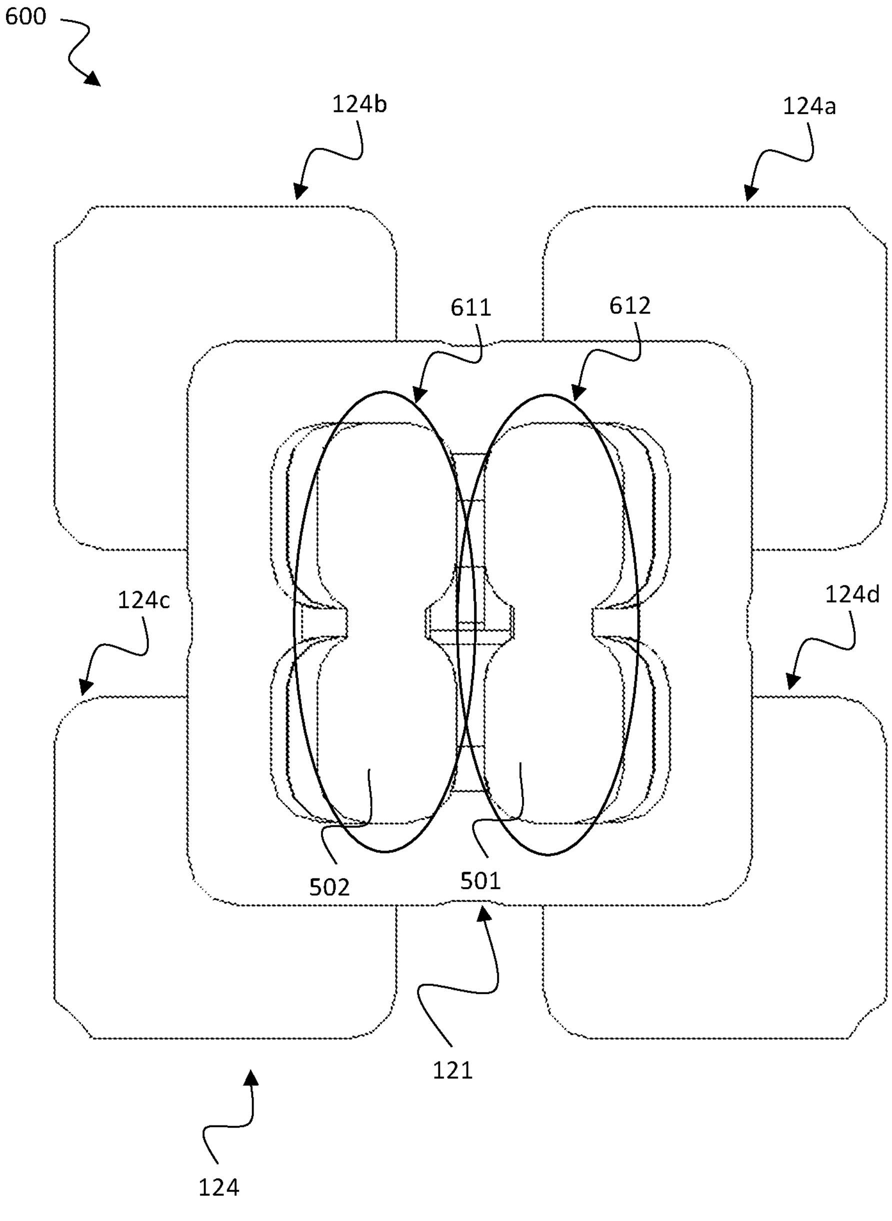
FIG. 6 shows a backside view of an example horn antenna element, according to the present application.

The septum polarizer 110 may comprise continuous ridged waveguide geometries 511, 512, 513, 514, 611, 612 from the two single linear polarized ports 501, 502 to the quad-ridge waveguide 121 of the horn radiator 120, e.g., as shown in FIGS. 5 and 6.

Figure 8:
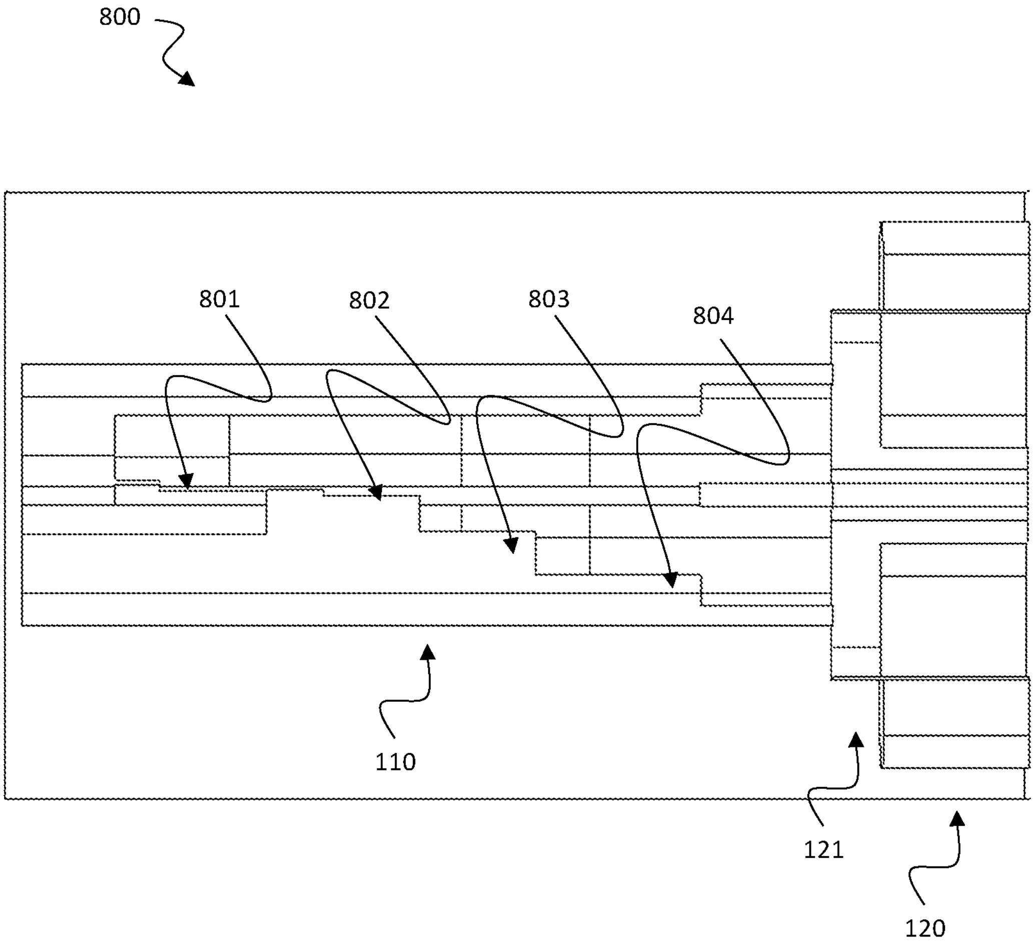
FIG. 8 shows a cut-plane side view into an example horn antenna element, according to the present application.

The septum polarizer 110 may be staircase-shaped 801, 802, 803, 804, e.g., as shown in FIG. 8, to transform the linear polarized input signal 102 into the circular polarized output signal 104.

A cross section of the quad-ridge waveguide 121 of the horn radiator 120 may corresponds to a cross section of the aperture grid 124 of the horn radiator 120, e.g., as shown in FIG. 3.

A geometry of the horn radiator 120 may be oversized with respect to a wavelength at a specified maximum operation frequency, in one form larger than one or multiple wavelengths at the specified maximum operation frequency. Such specified maximum operation frequency may be the end of Ka-band, in one form, or higher.

Figure 2:
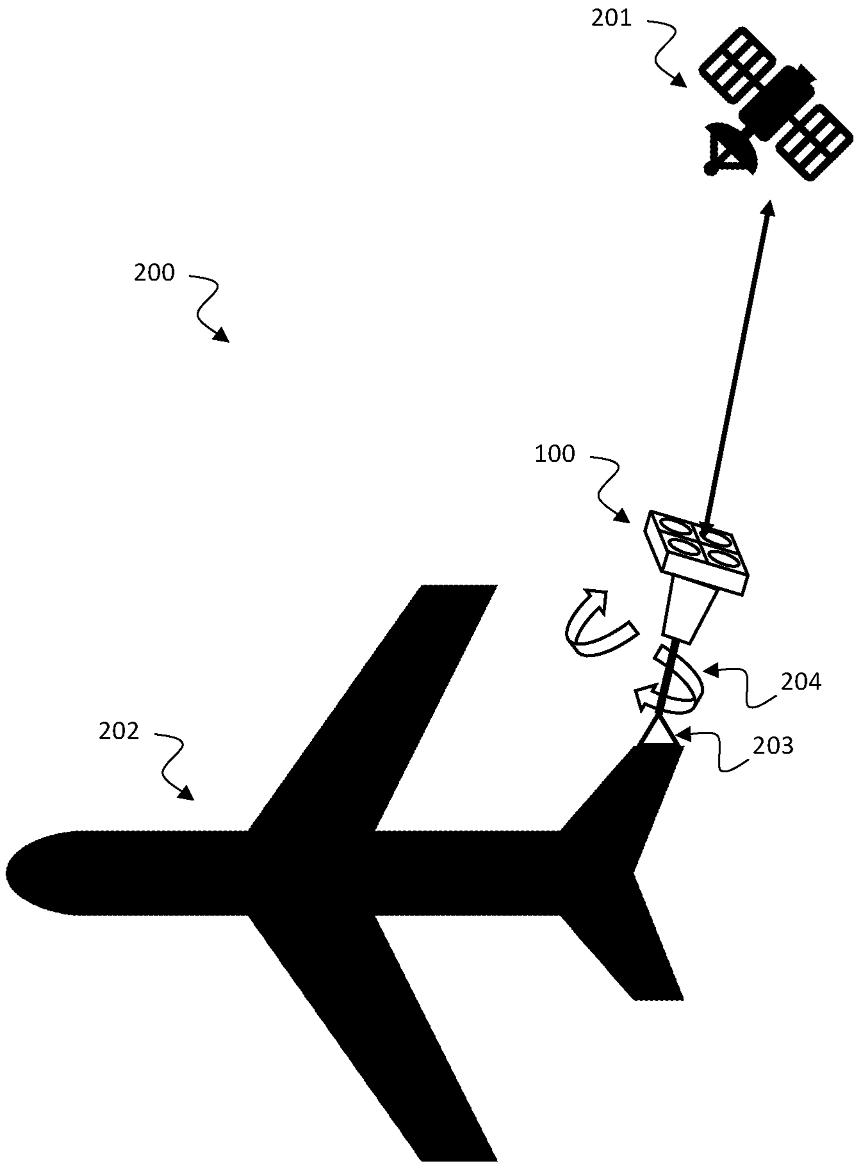
FIG. 2 shows a schematic diagram illustrating an airborne satellite communication system, according to the present application.

FIG. 2 shows a schematic diagram illustrating an airborne satellite communication system 200 according to the present disclosure.

The airborne satellite communication system 200 comprises a horn antenna element 100 as shown in FIG. 1 or FIGS. 3 to 10. The airborne satellite communication system 200 further comprises a multi-axis positioner 203 configured to permanently align 204 the horn antenna element 100 to a given target satellite 201. A processor or controller may be used to align the horn antenna to the satellite 201. The position of the satellite may be detected by receiving a signal from the satellite. The processor may align the multi-axis positioner 203 based on the determined satellite position.

The multi-axis positioner 203 and the horn antenna element 100 may be mounted at an airplane 202, in one form at a rear wing of the airplane 202.

FIG. 3 shows a front view 300 of one form of a horn antenna element 100 according to the present application.

The quad-ridge waveguides 124*a*, 124*b*, 124*c*, 124*d* are inside vacuum. The view onto the grid 124 (shown in FIG. 1) shows the division of the single horn into a virtual 2×2 array. Volume inside the horn is at first split in 4 equal sections, preforming virtual 2×2 array and finally it is covered by the grid that completes the 2×2 array. All parts involve quad-ridge waveguide geometric features 301*a*, 301*b*, 301*c*, 301*d*, 311*a*, 311*b*, 311*c*, 311*d*.

The quad-ridge waveguide 121 of the input geometry is illustrated by the structure 310 which comprises the four symmetrically formed ridges 311*a*, 311*b*, 311*c*, 311*d* of equal size. The upper ridge 311*a* and the lower ridge 311*c* are parallel to the left and right sides of the waveguide 121. The left-side ridge 311*d* and the right-side ridge 311*b* are parallel to the upper and lower sides of the waveguide 121.

The aperture grid 124 is formed as an array of quad-ridge waveguides 124*a*, 124*b*, 124*c*, 124*d*. In this form, a 2×2 array of quad-ridge waveguides 124*a*, 124*b*, 124*c*, 124*d* is shown. However, in another form, the array can be a 3×3 array or an 4×4 array or a higher dimension array. In another form, even arrays of non-squared size can be realized, such as a 2×3 array, a 2×4 array, a 3×4 array, etc.

The quad-ridge waveguides 124*a*, 124*b*, 124*c*, 124*d* of the aperture grid 124 are symmetrically formed, such that each of the quad-ridge waveguides 124*a*, 124*b*, 124*c*, 124*d* has a same cross section. The aperture grid 124 may have a squared cross section (e.g., with rounded edges) having a size of A, in one form. Then, the cross sections of the quad-ridge waveguides 124*a*, 124*b*, 124*c*, 124*d* may each be squares (also with rounded edges) of size A/4 in this implementation.

However, in another form, even different cross sections for the quad-ridge waveguides 124*a*, 124*b*, 124*c*, 124*d* can be implemented.

Each of the quad-ridge waveguides 124*a*, 124*b*, 124*c*, 124*d* of the aperture grid 124 comprises four ridges 301*a*, 301*b*, 301*c*, 301*d*.

The ridges 311*a*, 311*b*, 311*c*, 311*d* of the quad-ridge waveguide 121 of the input geometry and the ridges 301*a*, 301*b*, 301*c*, 301*d* of the array of quad-ridge waveguides 124*a*, 124*b*, 124*c*, 124*d* of the aperture grid 124 are formed in a non-overlapping manner. (i.e., both groups of ridges do not overlap as can be seen from FIG. 3).

However, in another form, an overlapping design can be implemented. Then, ridge 311*a* can overlap with ridge 301*b* and with the corresponding ridge of the quad-ridge waveguide 124*b*. Similarly, ridge 311*b* can overlap with the corresponding ridges of quad-ridge waveguides 124*b* and 124*c*; ridge 311*c* can overlap with the corresponding ridges of quad-ridge waveguides 124*c* and 124*d*; and ridge 311*d* can overlap with the corresponding ridges of quad-ridge waveguides 124*d* and 124*a*.

Figure 4:
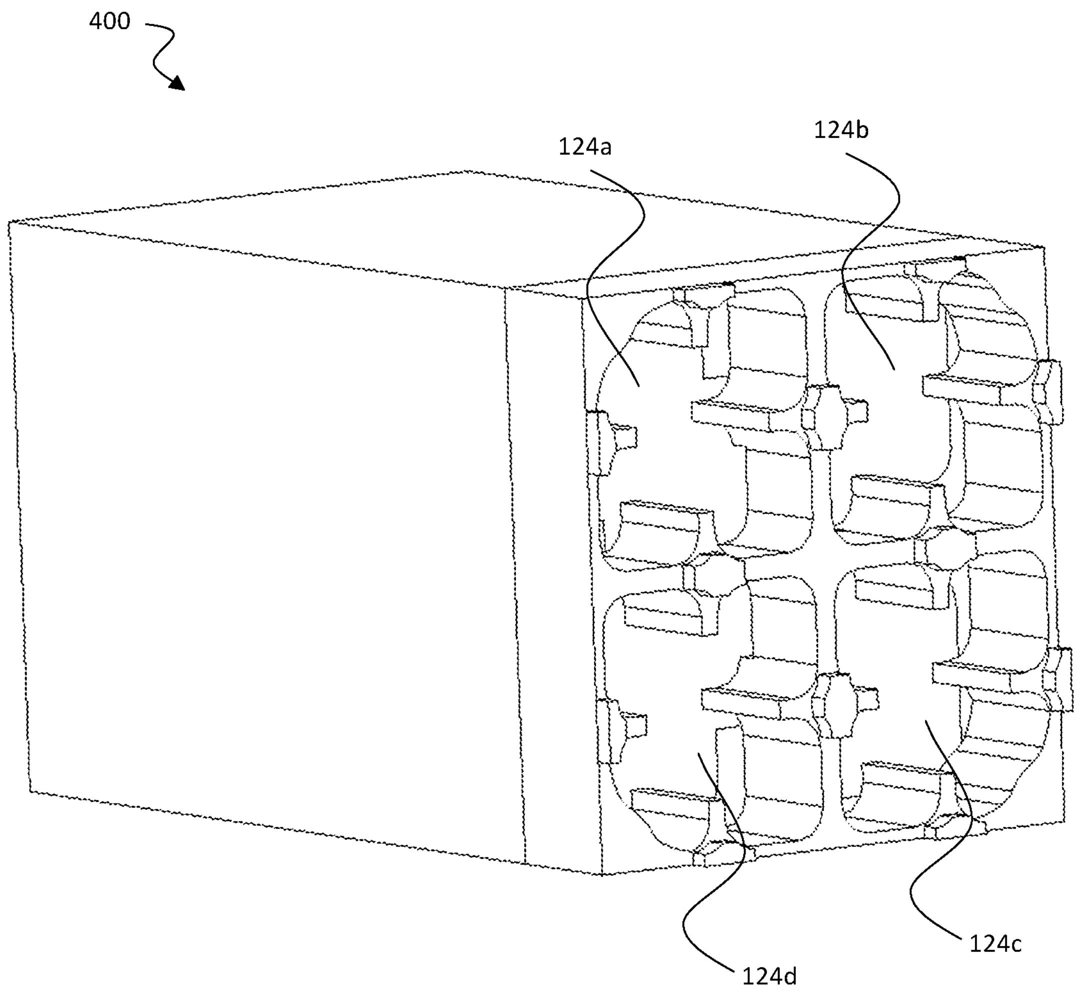
FIG. 4 shows a perspective view of an example horn antenna element, according to the present application.

FIG. 4 shows a perspective view 400 of one form of a horn antenna element 100 according to the present application. The grid 124 (as shown in FIG. 1) in front of horn is visible to divide horn aperture into a virtual 2×2 array. The grid shows quad-ridged waveguide like geometry to enable dual-band (very wideband) operation.

FIG. 5 shows a 3-dimensional representation 500 of one form of a horn antenna element 100 according to the present application. Shown is the vacuum section of the horn antenna element 100, i.e., inside vacuum of both septum polarizer 110 embedded in a quad-ridged waveguide 121 and the horn radiator 120. Continuous ridged waveguide geometries 511, 512, 513, 514 are implemented from the single linear polarized ports 501, 502 to the horn aperture.

FIG. 6 shows a backside view 600 of one form of a horn antenna element 100 according to the present application. Shown is the vacuum section of the horn antenna element 100, i.e., inside vacuum of both septum polarizer 110 embedded in a quad-ridged waveguide 121 and the horn radiator 120. The backside view is looking onto both orthogonally polarized ports 501, 502 of the septum polarizer 110. Ridged waveguide geometry 611, 612 are implemented at the input ports 501, 502. Transforming steps towards the septum polarizer 110 are visible in FIG. 6. The ridged geometry 611, 612 was chosen to reduce size (but keep cut off frequency as low as possible) of waveguide's cross-section, to be able to build a feeding network around it.

FIG. 7 shows a cut-plane view 700 into one form of a horn antenna element 100 according to the present application.

The septum polarizer 110 with its characteristic staircase shape is visible to transform linear polarized input signal 102 received at input ports 501, 502 into a circular polarized output signal 104 at the common port 112.

An input TE1,0 mode is split into a mode combination of TE1,0 (702) and TE0,1 (701) with +/−90° phase difference in between, thereby creating an either LHCP (704) or RHCP (703) signal to be radiated.

FIG. 8 shows a cut-plane side view 800 into one form of a horn antenna element 100 according to the present application. The polarizer "stair" 801, 802, 803, 804 is visible. The "staired" geometry allows for an easier manufacturing of the part.

Figure 9:
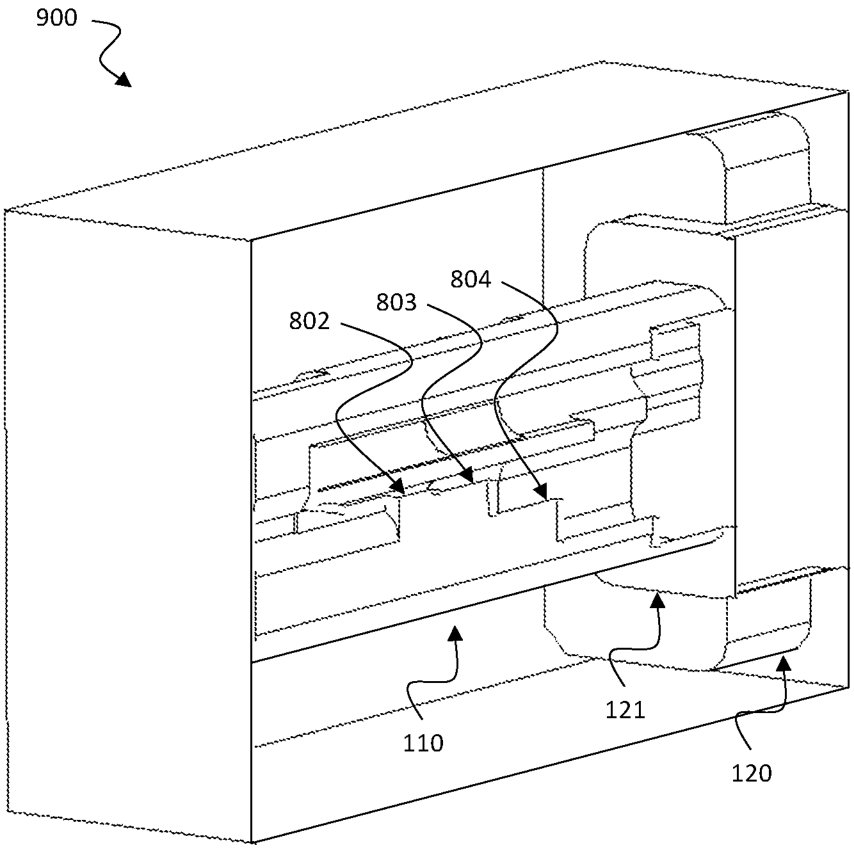
FIG. 9 shows a cut-plane perspective view into an example horn antenna element, according to the present application.

FIG. 9 shows a cut-plane perspective view 900 into one form of a horn antenna element 100 according to the present application. The polarizer "stair" 801, 802, 803, 804 is visible.

Figure 10:
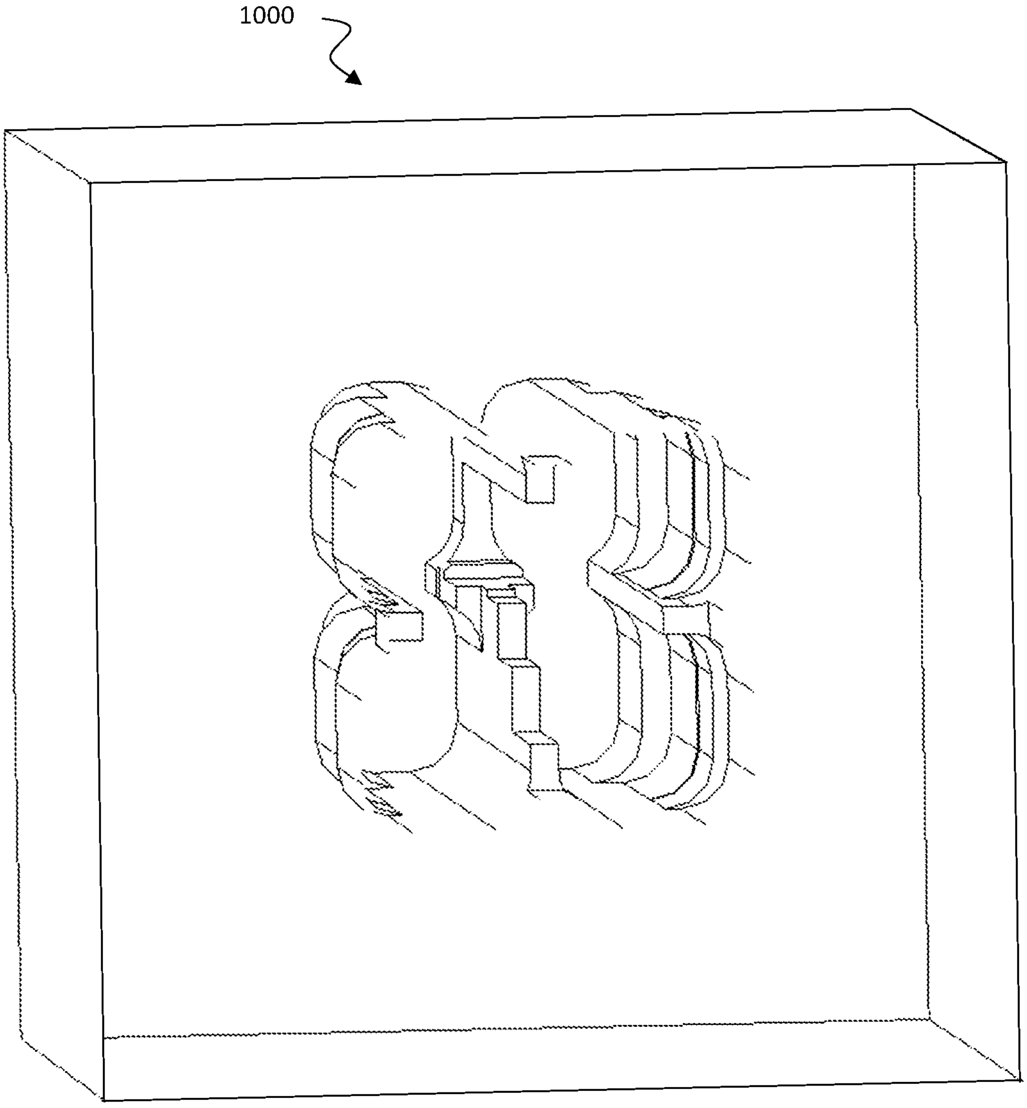
FIG. 10 shows a cut-plane front view into an example horn antenna element 100, according to the present application.

FIG. 10 shows a cut-plane front view 1000 into one form of a horn antenna element 100 according to the present application. The polarizer 110 is completely embedded into a quad-ridge waveguide geometry.

FIG. 11 shows a performance diagram illustrating S-parameters 1100 of one form of a horn antenna element 100 according to the present application. The graph above shows an example of S-parameter performance data.

S11 is the reflection coefficient 1101 of the linear polarized ports 501, 502 which is below 15 dB and free of any resonances in both K/Ka frequency bands. K frequency band is denoted as 1110 and Ka frequency band is denoted as 1120.

S21 is the isolation 1102 between both linear polarized ports 501, 502 which shows the characteristic dual-band behavior. Isolation 1102 is high enough for K-band Rx frequency range (17.7 GHz-20.2 GHz) and Ka-band Tx frequency range (27.5 GHz-30 GHz).

FIG. 12 shows a performance diagram illustrating axial ratio 1200 of one form of a horn antenna element 100 according to the present application.

The graph shows expected very good axial ratio 1201 performance with values <1 dB in both Rx and Tx frequency range, i.e., K-band Rx frequency range (17.7 GHz-20.2 GHz) and Ka-band Tx frequency range (27.5 GHz-30 GHz).

The horn antenna element 100 as presented in the present application can be used as but is not restricted to a Ka Band antenna as part of an airborne satellite communication system. The horn antenna element 100 can be implemented together with another antenna design for Ku-Band such that user have the advantage to choose between Ku- or Ka-band products using one and the same platform. The antenna can be used, in one form, as a tailmount antenna, or as another type of antenna. The horn antenna element 100 can also be used as an antenna in other frequency ranges not described in the present application.

While one form of the present application may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless of whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the present disclosure beyond those described herein. While the present disclosure has been described with reference to one or more particular forms and/or variations, those skilled in the art recognize that many changes may be made thereto without departing from the scope of the present disclosure. It is therefore to be understood that within the scope of the appended claims and their equivalents, the present disclosure may be practiced otherwise than as specifically described herein.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A horn antenna element comprising:

a septum polarizer configured to transform a linear polarized input signal into a circular polarized output signal at a common port; and a horn radiator comprising:

an input geometry formed as a quad-ridge waveguide to receive the circular polarized output signal at the common port, the quad-ridge waveguide of the input geometry comprises four symmetrically formed ridges of equal size; and an aperture grid to radiate a grid-based circular polarized output signal, wherein the septum polarizer is embedded in the quad-ridge waveguide at the common port, the aperture grid is formed as an array of quad-ridge waveguides, and the array of quad-ridge waveguides is a 2×2 array of quad-ridge waveguides.

2. The horn antenna element of claim 1, wherein the quad-ridge waveguides of the aperture grid are symmetrically formed, each of the quad-ridge waveguides having a same cross section.

3. The horn antenna element of claim 1, wherein each of the quad-ridge waveguides of the aperture grid comprises four ridges.

4. The horn antenna element of claim 3, wherein the four symmetrically formed ridges of the quad-ridge waveguide of the input geometry and the four ridges of the array of quad-ridge waveguides of the aperture grid are formed in a non-overlapping manner.

5. The horn antenna element of claim 1, wherein the septum polarizer is configured to split an input TE1,0 mode of the linear polarized input signal into a mode combination of TE1,0 and TE0,1 with +/−90 degree phase difference in between, thereby creating an either left-handed circular polarization, LHCP, signal or right-handed circular polarization, RHCP, signal to be radiated by the horn radiator.

6. The horn antenna element of claim 3, further comprising two single linear polarized ports configured to receive, transmit or a combination thereof a respective linear polarized component of the linear polarized input signal.

7. The horn antenna element of claim 6, wherein the two single linear polarized ports are configured to simultaneously receive and transmit in a K-band frequency range and a Ka-band frequency range.

8. The horn antenna element of claim 7, wherein:

a reflection coefficient of the two single linear polarized ports is below a predetermined threshold and is free of resonances in both the K-band frequency range and the Ka-band frequency range; and the predetermined threshold is below −15 dB.

9. The horn antenna element of claim 7, wherein an axial ratio of the grid-based circular polarized output signal is below 1 dB in both the K-band frequency range and the Ka-band frequency range.

10. The horn antenna element of claim 6, wherein:

the septum polarizer comprises continuous ridged waveguide geometries from the two single linear polarized ports to the quad-ridge waveguide of the horn radiator; and the septum polarizer is staircase-shaped to transform the linear polarized input signal into the circular polarized output signal.

11. The horn antenna element of claim 1, wherein a cross section of the quad-ridge waveguide of the horn radiator corresponds to a cross section of the aperture grid of the horn radiator.

12. The horn antenna element of claim 1, wherein a geometry of the horn radiator is oversized with respect to a wavelength at a specified maximum operation frequency and is larger than one or multiple wavelengths at the specified maximum operation frequency.

13. An airborne satellite communication system, the airborne satellite communication system comprising:

the horn antenna element of claim 1; and a multi-axis positioner configured to permanently align the horn antenna element to a given target satellite.

* * * * *